United States Patent [19]

Chiarottino et al.

[11] Patent Number: 4,470,110
[45] Date of Patent: Sep. 4, 1984

[54] SYSTEM FOR DISTRIBUTED PRIORITY ARBITRATION AMONG SEVERAL PROCESSING UNITS COMPETING FOR ACCESS TO A COMMON DATA CHANNEL

[75] Inventors: Volmer Chiarottino, Villanova C. Se; Cesare Poggio, both of Turin; Aldo Reali, Caselle, all of Italy

[73] Assignee: Cselt Centro Studi E Laboratori Telecommunicazioni S.p.A., Turin, Italy

[21] Appl. No.: 318,254

[22] Filed: Nov. 4, 1981

[30] Foreign Application Priority Data

Nov. 6, 1980 [IT] Italy .................... 68691 A/80

[51] Int. Cl.³ .................... G06F 15/16; G06F 9/46
[52] U.S. Cl. .................... 364/200; 370/85; 370/94
[58] Field of Search ... 364/200 MS File, 900 MS File; 370/94, 85, 104; 375/119

[56] References Cited

U.S. PATENT DOCUMENTS

| | | | |
|---|---|---|---|
| 3,818,447 | 6/1974 | Craft | 364/200 |
| 4,071,706 | 1/1978 | Warren | 179/15 AL |
| 4,156,277 | 5/1979 | Seitz et al. | 364/200 |
| 4,209,838 | 6/1980 | Alcorn, Jr. et al. | 364/200 |
| 4,229,791 | 10/1980 | Levy et al. | 364/200 |
| 4,232,294 | 11/1980 | Burke et al. | 340/147 LP |
| 4,292,623 | 9/1981 | Eswaran et al. | 340/147 R |
| 4,320,502 | 3/1982 | De Veer | 370/85 |
| 4,330,857 | 5/1982 | Alvarez | 370/104 |
| 4,357,707 | 11/1982 | Delury | 375/119 |
| 4,373,183 | 2/1983 | Means et al. | 364/200 |
| 4,385,350 | 5/1983 | Hansen et al. | 364/200 |
| 4,387,425 | 6/1983 | El-Gohary | 364/200 |

FOREIGN PATENT DOCUMENTS 1480208  7/1977  United Kingdom .

OTHER PUBLICATIONS

N. Abramson et al., *The Aloha System, Computer-Communications Networks,* (Prentice-Hall, Inc.), pp. 501–517.
IBM Technical Disclosure Bulletin, vol. 22, No. 3, Aug. 1979, p. 1059, *Look-Ahead Access Request Circuit for Computer Systems,* A. Blum.
IBM Technical Disclosure Bulletin, vol. 23, No. 7A, Dec. 1980, p. 3043, *Asynchronous Contention Resolution,* D. F. Bantz et al.

*Primary Examiner*—James D. Thomas
*Assistant Examiner*—Archie E. Williams, Jr.
*Attorney, Agent, or Firm*—Karl F. Ross; Herbert Dubno

[57] ABSTRACT

A system for the exchange of messages among a multiplicity of processing units includes a data channel and a service line interconnecting respective interfaces of these units. Each interface includes a busy-state detector determining during a test phase of a recurrent time slot whether the service line is available, a logic network connectable in a subsequent acquisition phase the service line in the event of its availability to emit successive bits of an address characterizing the respective processing unit, and a comparator determining during the aquisition phase whether an emitted address bit of a particular logic level ("1") coincides with another bit of a higher-priority level ("0") concurrently sent over the line by some other unit. If a higher-priority address bit is encountered, the emission of the address is aborted and restarted in a subsequent time slot. If there is no conflict, an outgoing message is delivered to the data channel by way of a concurrently enabled driver; should that message require more than one time slot for its transmission, the service line is seized by the emission of a busy bit in the test phases of one or more subsequent time slots preceding the last time slot occupied by that message.

6 Claims, 3 Drawing Figures

SYSTEM FOR DISTRIBUTED PRIORITY ARBITRATION AMONG SEVERAL PROCESSING UNITS COMPETING FOR ACCESS TO A COMMON DATA CHANNEL

FIELD OF THE INVENTION

Our present invention relates to a data-handling system with a multiplicity of processing units of different character, disposed not too far apart, dialoguing with one another by an exchange of messages.

BACKGROUND OF THE INVENTION

With a relatively small number of such units it is not too inconvenient to provide them with individual connections enabling the exchange of messages between any two of them. In a more elaborate system it is known to use time-division multiplexing by assigning to each unit a respective time slot in a recurrent frame; such a system, however, does not operate efficiently when data are emitted by the several units at irregular intervals in the form of packets or bursts so that the average rate of utilization of each time slot is low. A further alternative, using a single bus for communication among all the processing units, requires rather complex logical circuitry for arbitrating, on the basis of different priority levels, among simultaneous requests for access to the bus by several such units.

An arrangement of the latter type, in which a common communication channel or bus is randomly accessible to the various processing units exchanging messages with a centralized station, is known as the Aloha System described by Norman Abramson and Franklin F. Kuo in Computer-Communication Networks published 1973 by Prentice-Hall, Inc. In that system the problem of possible interference between concurrently emitted messages is solved by blocking the transmission of any overlapping packets and thereafter attempting their retransmission at different times. As the likelihood of collisions increases with the number of processing units, the channel may remain unused for extended periods in a multi-unit system of this type.

OBJECT OF THE INVENTION

The object of our present invention, therefore, is to provide means in such a data-handling system for facilitating the orderly exchange of messages among processing units of different ranks.

SUMMARY OF THE INVENTION

The processing units of our improved data-handling system have individual interfaces interconnected by two signal links, namely a common data channel and a common service line, a synchronizing signal being emitted over the service line by a timer during an initial phase of a periodically recurring time slot. Each interface comprises message-transmitting means and message-receiving means inserted between the data channel and the associated processing unit, storage means containing a combination of address bits which characterize the associated unit, a time base connected to the service line for detecting the initial phase of a time slot and establishing an acquisition phase following its initial phase, signal-generating means having an input connected to the storage means and an output connected to the service line while being controlled by the time base and responsive to commands from the associated processing unit for sending out the address bits during the acquisition phase preparatorily to the emission of data via the aforementioned message-transmitting means, and comparison means connected to the service line and to the output of the signal-generating means for discovering during each of several bit periods of the acquisition phase a possible difference between the logic levels of an outgoing address bit emitted by the signal-generating means and an incoming address bit appearing concurrently on the service line. In the presence of such a concurrent incoming address bit, the emission of further address bits by the signal-generating means is prevented for the remainder of the time slot by the comparison means in the event of a predetermined difference between these bits indicating a higher priority of the incoming address bit. A connection between the signal-generating means and the message-transmitting means enables the latter to be activated upon emission of the last address bit to deliver outgoing data to the channel in one or more subsequent time slots under the control of the time base.

If an outgoing message is to occupy more than one time slot, the interface may be further provided with discriminating means connected to the service line and with a down counter settable by the associated processing unit to a number $k-1$ where $k$ is the number of time slots required for a message to be sent out. The down counter controls the signal-generating means to cause the emission of a busy bit to the service line in a test phase (prior to the acquisition phase) of any time slot preceding the last time slot required by the outgoing message which is in the process of being transmitted, the down counter being decremented upon the emission of each busy bit. The time base controls the discriminating means to inhibit the signal-generating means during the acquisition phase of a time slot in whose test phase a busy bit is detected on the service line.

In the embodiment more particularly described hereinafter, an address bit having the logic level "0" takes priority over a logic level "1" of a concurrent address bit. Thus, the emission of further address bits by the signal-generating means of a given interface is prevented only if the outgoing address bit has the value "1" while the incoming address bit has the dominant value "0". This is particularly advantageous where the service line is constituted by a wire which can be grounded, e.g. through a transistor of the open-collector type, by a signal of logical value "0" emitted from any interface connected thereto. In principle, however, the logical value "1" could also be designated as the dominant one, as where that service line is an optical fiber illuminated by a high-level signal.

The addresses of the several intercommunicating processing units should, of course, be coded in conformity with their respective ranks on a scale of priorities. If the system includes two or more units of equal rank, the assignment of priorities to them will necessarily be somewhat arbitrary. In such a case we prefer to insert an inverter in the output of the signal-generating means which, in response to a command from the associated processing unit, complements an emitted address bit so that its code assumes a different rank in the priority scale; such complementation, of course, must not result in an address code duplicating that of another unit. The address codes will also have to be different from the bit combination representing the synchronizing signal.

BRIEF DESCRIPTION OF THE DRAWING

The above and other features of our invention will now be described in detail with reference to the accompanying drawing in which.

SPECIFIC DESCRIPTION

Figure 1:
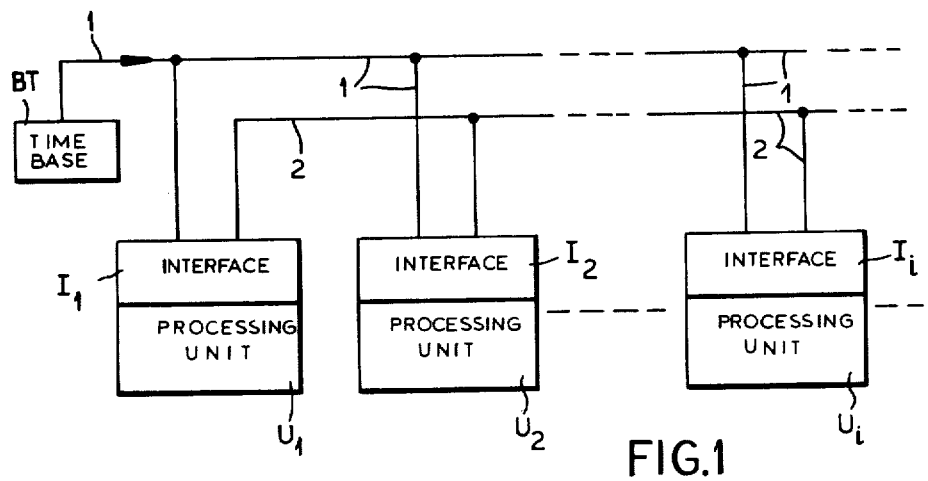
FIG. 1 is a block diagram giving an overview of a message-handling system embodying our invention.

In FIG. 1 we have shown a data-handling system comprising a multiplicity of processing units $U_1$, $U_2$ ... $U_i$ ... provided with respective interfaces $I_1$, $I_2$ ... $I_i$ ... interconnected by a pair of transmission links, namely a common service line 1 and a common data channel 2. A central time base BT is connected to line 1. The two links 1 and 2 may be of various types, including metallic leads and optical fibers as noted above. If metallic, they may form respective conductors of a coaxial cable or of a twisted wire pair.

Figure 2:
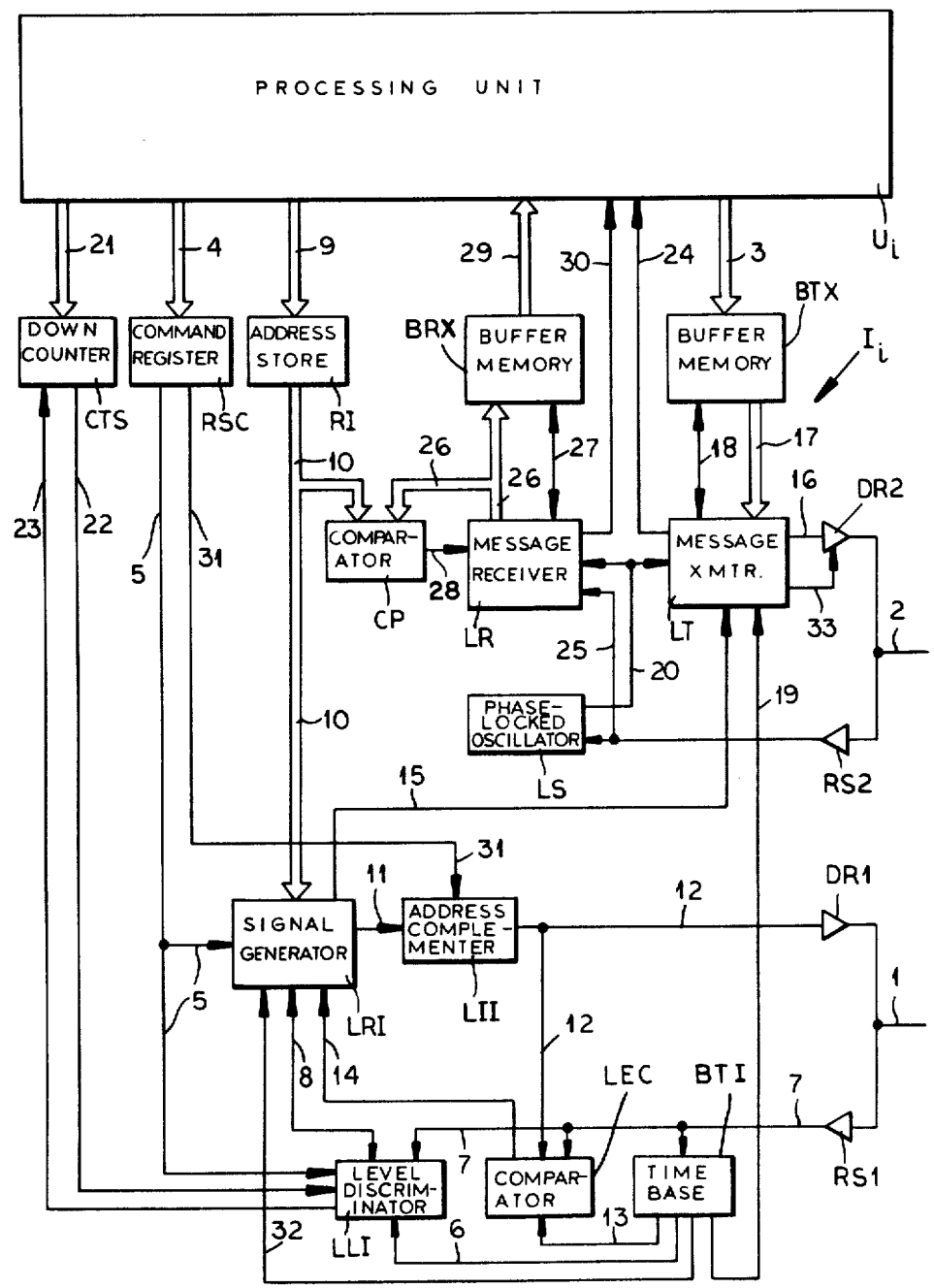
FIG. 2 is a more detailed diagram of an interface associated with a processing unit of the system of FIG. 1.

In FIG. 2 we have illustrated in greater detail the interface $I_i$ of unit $U_i$ representative of all the interfaces shown in FIG. 1. This interface comprises a driver or power amplifier DR1 and a receiving amplifier RS1 connected to service line 1 as well as a driver DR2 connected together with a receiving amplifier RS2 to data channel 2. The two drivers may be transistors operating in the open-collector mode. Outgoing data bits are delivered to channel 2 via a lead 16 and driver DR2 by a message transmitter LT while incoming data bits are fed by receiving amplifier RS2 and a lead 25 to a message receiver LR; the two components LT and LR may be simply designed as shift registers. Message receiver LR supplies the incoming data bits, arriving during one or more time slots established by circuit BT of FIG. 1, in parallel via a multiple 26 to a buffer memory BRX which exchanges signals with component LR via a two-way connection 27 and delivers the stored bits to unit $U_i$ through a multiple 29 after that unit has been rendered receptive therefor by a signal conveyed to it from component LR over a lead 30. Another buffer memory BTX stores outgoing data bits, received in parallel from unit $U_i$ over a multiple 3, and forwards them via another multiple 17 to message transmitter LT with which it exchanges signals over a two-way connection 18. Driver DR2 is normally inhibited by a signal on another output lead 33 of transmitter LT.

Components LT and LR operate at a bit rate established, independently of time base BT, by a phase-locked oscillator LS which feeds timing pulses to these components by way of a lead 20 and is synchronized with incoming data bits by an input connected to lead 25. An output lead 24 of transmitter LT informs the processing unit $U_i$ of the completed emission of an outgoing message fed thereto from buffer memory BTX.

Two other multiples 4 and 9 extend from processing unit $U_i$ to a command register RSC and to an address store RI, respectively. Multiple 9, delivering the address code of unit $U_i$ to address store RI, could be omitted if that code is hard-wired in the address store itself. An output multiple 10 of circuit RI extends to one set of inputs of a comparator CP which has another set of inputs connected to a branch of multiple 26 in order to determine whether a destination-identifying header of an incoming message corresponds to the local address code; if that determination is positive, receiver LR is enabled via a lead 28 to read out the remainder of that message to buffer register BRX. Multiple 10 further extends to a signal generator LRI which can be activated by a command from register RSC, appearing on an output lead 5 thereof, to emit that address code bit by bit to service line 1 by way of a lead 11, an address complementer LII normally transparent to these bits, a lead 12 and driver DR1. Circuit LII may be an Exclusive-OR gate which, in the presence of a logic level "0" on another input lead 31 originating at command register RSC, transmits the outgoing address bits unchanged to driver DR1; if that logic level is "1", the outgoing address bits are inverted. Signal generator LRI also has an output lead 15 extending to an enabling input of message transmitter LT.

An output lead 7 of receiving amplifier RS1 is connected in parallel to a local time base BT1, a comparator LEC and a level discriminator LLI, the latter exchanging signals with generator LRI via a two-way connection 8. A down counter CTS, settable via an output multiple 21 of processing unit $U_i$ to register a numerical value $k-1$ where k is the number of time slots required for the emission of an outgoing message, has an output lead 22 extending to discriminator LLI and an input lead 23 originating at that discriminator. Time base BT1 has output leads 6, 13, 19 and 32 for the transmission of enabling pulses to components LLI, LEC, LT and LRI, respectively. Comparator LEC has two inputs connected to leads 7 and 12 and is provided with an output lead 14 terminating at an inhibiting input of signal generator LRI.

Figure 3:
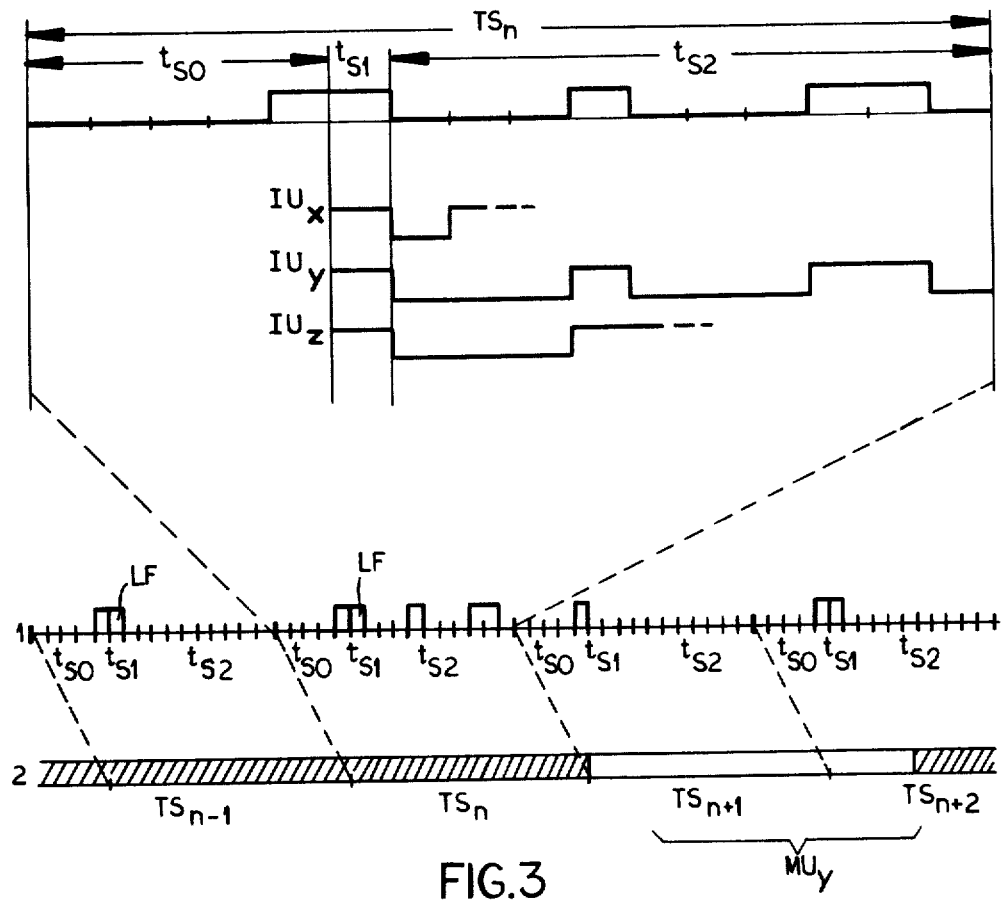
FIG. 3 is a graph relating to the operation of the interface of FIG. 2.

We shall now refer to FIG. 3 for a description of the signals delivered by generator LRI to service line 1 and their correlation with the transmission of outgoing messages over channel 2 by component LT. The two lower graphs of this Figure show the activity of links 1 and 2 in the course of several time slots designated $TS_{n-1}$, $TS_n$, $TS_{n+1}$ and $TS_{n+2}$. Time slot $TS_n$ has been shown enlarged in the top graph. Periods of inactivity of channel 2 have been indicated by hatching. It will also be noted that, owing to internal delays of interface $I_i$, the time slots on channel 2 are offset from those on line 1 by a fractional lag.

As indicated in FIG. 3, each time slot is subdivided into an initial phase $t_{S0}$, a test phase $t_{S1}$ and an acquisition phase $t_{S2}$. In this specific example, phase $t_{S0}$ encompasses five bit positions, phase $t_{S1}$ consists of a single bit position and phase $t_{S2}$ extends over ten bit positions, thus accommodating an address code of ten bits.

An invariable synchronizing signal, here shown to be the bit combination 00001, appears on line 1 during the initial phase $t_{S0}$ of each time slot. In the example given, there is no activity in time slot $TS_{n-1}$ during which a "line free" bit LF of logic level "1" appears in test phase $t_{S1}$. In the following time slot $TS_n$, in which the same bit denoting the free state of line 1 is present, we have assumed that three processing units of the system of FIG. 1 compete for access to channel 2 by starting the emission of their respective address codes $IU_x$, $IU_y$, $IU_z$ from their associated interfaces over line 1. Each address code, it will be noted, will be preceded by a test bit "1" in phase $t_{S1}$ which is fed by connection 8 (FIG. 2) to discriminator LLI for comparison with a possible "busy" bit LF of logic level "0" on line 1. As the line is free in the case being described, generator LRI of each interface is able to send out the first bit of its address code.

In the present instance, the first bit of each address $IU_x$, $IU_y$, $IU_z$ has the logical value "0" which corresponds to the normal signal level on line 1. Each comparator LEC, accordingly, allows its signal generator LRI to emit the second address bit which here has the logical value "1" for address $IU_x$ and the logical value "0" for the two other addresses. The comparator LEC of the unit identified by address $IU_x$, therefore, detects a disparity between the levels of its input signals and, finding that the dominant level "0" is present on lead 7, energizes its output lead 14 to deactivate and reset the generator LRI, thereby aborting the emission of the address code which can be attempted again at a later time. Addresses $IU_y$ and $IU_z$ have identical bits in the next two positions, yet the fifth bit of address $IU_y$ is "0" whereas that of address $IU_z$ is "1". The unit identified by address $IU_z$, therefore, drops out in the fifth bit position of phase $t_{S2}$, leaving the field to the unit with the highest-priority address code $IU_y$.

When the last address bit of the prevailing unit has been emitted by its signal generator LRI, the latter energizes its output lead 15 to activate the message transmitter LT. At the beginning of the immediately following time slot $TS_{n+1}$, as signaled to component LT by time base BTI on lead 19, this component unblocks the driver DR2 by a signal on lead 33 preparatorily to reading out the data bits received in parallel (via multiple 17) from buffer memory BTX. That message, whose beginning and end may be marked by respective "flag" codes, ought to include—in addition to the aforementioned header—an identification of the originating units as well as the usual parity code enabling the detection of errors. Its format may correspond to a high-level protocol of the SDLC/HDLC types. Unless the system operates with messages of uniform length, there may also be included a code indicating the number of bits.

The outgoing data message, designated $MU_y$ in the bottom graph of FIG. 3, is assumed to occupy not only the following time slot $TS_{n+1}$ but also part of the next time slot $TS_{n+2}$. Upon delivering that message via multiple 3 to buffer memory BTX, the processing unit has also advanced the down counter CTS by one step whereby lead 22 is energized and, upon the recurrence of phase $t_{S1}$ in time slot $TS_{n+1}$ is signaled to discriminator LLI on lead 6, causes that discriminator to command via connection 8 the emission of a "0" bit by generator LRI during that phase in order to seize the service line 1 for the remainder of the time slot. No other address code can therefore appear on the line in time slot $TS_{n+1}$.

Simultaneously with the transmission of the seizure command to signal generator LRI, discriminator LLI also energizes the lead 23 to decrement the counter CTS. Since in this example the counter is thereby reset to zero, another unit may seize the line 1 in the next time slot $TS_{n+2}$ even though message bits are still being transmitted by the previously victorious unit over channel 2. In the case of an outgoing message occupying only a single time slot, therefore, counter CTS does not intervene. If all messages can be accommodated by a single time slot, the counter becomes unnecessary; in that case, also, the test phase $t_{S1}$ could be eliminated so that there would be no need for the discriminator LLI.

The end of message transmission is reported by component LT to the processing unit via lead 24.

In the foregoing description we have assumed that lead 31 has remained de-energized so that address complementer LII did not modify the bits present on lead 11. If, however, unit $U_i$ were to deliver to register RSC an inversion command transmitted via lead 31 to complementer LII, the address bits appearing on lead 12 would indicate a different priority rating for that unit enabling it to compete successfully with another unit of equal rank. Thus, for example, unit $U_i$ may have an address code 101XX . . . which would have to yield to an address code 011YY . . . of a competing unit, yet a bit-by-bit inversion of that address would result in a code $010\overline{XX}$ . . . prevailing over the competing code. With or without inversion, however, both units would still have address codes prevailing over an address code 110ZZ . . . of a unit of lower rank. A processing unit may, accordingly, be programmed to emit an inversion command after prolonged exclusion from service line 1 in order to win out over a unit of like rank to which a higher priority has been assigned, yet such inversion ought to be canceled after the transmission of an outgoing message has been completed.

In detecting the free or busy state of service line 1, discriminator LLI operates in a manner analogous to that of comparator LEC by determining whether or not the test bit "1" generated in phase $t_{S1}$ preparatorily to the emission of address bits is matched by a "line free" bit LF on lead 7 or is outweighed by a "busy" bit $\overline{LF}$. The test bit, of course, is not inverted by the operation of complementer LII; in a system requiring no complementation, discriminator LLI may be a part of comparator LEC activated by a timing pulse on lead 6.

Under suitable control from time base BTI, complementer LII could also be made responsive to an inversion command affecting less than all the address bits passing therethrough.

With receiving amplifier RS2 feeding back to component LR the outgoing messages transmitted by component LT, such feedback can be utilized to check on the operation of the interface.

Signal generator LRI may be designed as a shift register which is cleared by the disabling signal on lead 14 and is then reloaded via multiple 10 from address store RI in the initial phase of the next time slot.

We claim:

1. In a data-handling system with a multiplicity of processing units dialoguing with one another by an exchange of messages, the combination therewith of an interface individually associated with each processing unit, a common data channel and a common service line connected to all the interfaces associated with said processing units, and a timer emitting over said service line a synchronizing signal during an initial phase of a periodically recurring time slot, said interface comprising:

message-transmitting means and message-receiving means inserted between said data channel and the associated processing unit;

storage means containing a combination of address bits characterizing the associated processing unit;

a time base connected to said service line for detecting the initial phase of a time slot and establishing in the remainder of the time slot, following said initial phase, a test phase followed by an acquisition phase;

signal-generating means having an input connected to said storage means and an output connected to said service line, said signal-generating means being controlled by said time base and responsive to commands from the associated processing unit for sending out said address bits during said acquisition phase preparatorily to the emission of data via said message-transmitting means;

comparison means connected to said service line and to said output of said signal-generating means for discovering, during each of several bit periods of said acquisition phase, a possible difference between the logic levels of an outgoing address bit from said signal-generating means and an incoming address bit concurrently appearing on said service line and, in the event of a predetermined difference indicating a higher priority of the incoming address bit, resetting said signal-transmitting means while preventing the emission of further outgoing address bits for the remainder of the time slot, said message-transmitting means being connected to said signal-generating means for activation thereby upon emission of the last address bit to deliver outgoing data to said channel in at least one subsequent time slot under the control of said time base;

discriminating means connected to said service line; and a down counter settable by the associated processing unit to a number (k−1) where k is the number of time slots required for a message to be sent out, said signal-generating means being controlled by said down counter for emitting a busy bit to said service line in said test phase of any time slot preceding the last time slot required by an outgoing message in the process of being transmitted, said down counter being decremented upon the emission of each busy bit by said signal-generating means, said discriminating means being controlled by said time base for inhibiting said signal-generating means during the acquisition phase of a time slot in whose test phase a busy bit is detected on said service line.

2. The combination defined in claim 1 wherein said interface further comprises an address comparator with inputs connected to said storage means and to said message-receiving means for ascertaining from a destination-identifying part of an incoming message whether same is intended for the associated processing unit and, in such event, enabling said message-receiving means to forward the incoming message to the associated processing unit.

3. The combination defined in claim 1 wherein said interface further comprises a phase-locked oscillator connected to said message-transmitting means and to said message-receiving means for controlling the emission of outgoing and the reception of incoming data bits.

4. The combination defined in claim 1 wherein said interface further comprises an inverter in said output of said signal-generating means responsive to a command from the associated processing unit for complementing an address bit emitted thereby.

5. The combination defined in claim 1 or 4 wherein the connection between said output of said signal-generating means and said service line includes a driver of the open-collector type establishing a low-voltage signal level on said service line in transmitting a "0" bit having priority over a "1" bit concurrently emitted by an interface of another processing unit.

6. In a data-handling system with a multiplicity of processing units dialoguing with one another by an exchange of messages, the combination therewith of an interface individually associated with each processing unit, a common data channel and a common service line connected to all the interfaces associated with said processing units, and a timer emitting over said service line a synchronizing signal during an initial phase of a periodically recurring time slot, said interface comprising:

message-transmitting means and message-receiving means inserted between said data channel and the associated processing unit;

storage means containing a combination of address bits constituting a characteristic code of the associated processing unit;

a time base connected to said service line for detecting the initial phase of a time slot and establishing an acquisition phase following said initial phase;

signal-generating means having an input connected to said storage means and an output connected to said service line, said signal-generating means being controlled by said time base and responsive to commands from the associated processing unit for sending out said address bits during said acquisition phase preparatorily to the emission of data via said message-transmitting means;

comparison means connected to said service line and to said output of said signal-generating means for discovering, during each of several bit periods of said acquisition phase, a possible difference between the logic levels of an outgoing address bit from said signal-generating means and an incoming address bit concurrently appearing on said service line and, in the event of a predetermined difference indicating a higher priority of the incoming address bit, resetting said signal-transmitting means while preventing the emission of further outgoing address bits for the remainder of the time slot, said message-transmitting means being connected to said signal-generating means for activation thereby upon emission of the last address bit to deliver outgoing data to said channel in at least one subsequent time slot under the control of said time base; and an inverter in said output of said signal-generating means responsive to a command from the associated processing unit for modifying said characteristic code by complementing an address bit emitted by said signal-generating means.

* * * * *